United States Patent
Voller et al.

(10) Patent No.: US 10,931,136 B2
(45) Date of Patent: *Feb. 23, 2021

(54) PORTABLE ELECTRONIC DEVICE

(71) Applicant: Zapgo Ltd, Oxfordshire (GB)

(72) Inventors: Stephen Voller, Hampshire (GB); Marappa Rajendran, Coventry (GB); Tim Walder, Winchester (GB)

(73) Assignee: Zapgo Ltd, Oxfordshire (GB)

( * ) Notice: Subject to any disclaimer, the term of this patent is extended or adjusted under 35 U.S.C. 154(b) by 66 days.

This patent is subject to a terminal disclaimer.

(21) Appl. No.: 15/358,570

(22) Filed: Nov. 22, 2016

(65) Prior Publication Data
US 2017/0155265 A1    Jun. 1, 2017

(30) Foreign Application Priority Data

Nov. 26, 2015   (GB) .................................... 1520868

(51) Int. Cl.
| | |
|---|---|
| *H02J 7/00* | (2006.01) |
| *H02J 7/34* | (2006.01) |
| *G06F 1/16* | (2006.01) |
| *G06F 1/26* | (2006.01) |
| *H01G 11/08* | (2013.01) |
| *H01G 11/36* | (2013.01) |
| *H01G 11/62* | (2013.01) |

(52) U.S. Cl.
CPC ............ *H02J 7/342* (2020.01); *G06F 1/1635* (2013.01); *G06F 1/1637* (2013.01); *G06F 1/263* (2013.01); *H01G 11/08* (2013.01); *H01G 11/36* (2013.01); *H01G 11/62* (2013.01); *H02J 7/0029* (2013.01); *H02J 7/345* (2013.01); *Y02E 60/13* (2013.01)

(58) Field of Classification Search
CPC ........ H02J 7/0054; H02J 7/345; H02J 7/0029; G06F 1/1635; G06F 1/1637; G06F 1/263; H01G 11/08; H01G 11/36; H01G 11/62
USPC ...................... 320/103, 166; 361/274.3, 503
See application file for complete search history.

(56) References Cited

U.S. PATENT DOCUMENTS

| | | | |
|---|---|---|---|
| 5,827,602 A | 10/1998 | Koch et al. | |
| 8,503,161 B1 | 8/2013 | Chang et al. | |

(Continued)

FOREIGN PATENT DOCUMENTS

| | | |
|---|---|---|
| CN | 103701164 A | 4/2014 |
| CN | 104064364 A | 9/2014 |

(Continued)

*Primary Examiner* — Zixuan Zhou
(74) *Attorney, Agent, or Firm* — Hodgson Russ LLP

(57) ABSTRACT

A portable battery-powered electronic device including a battery, a microprocessor and a display screen is provided. The device is characterised in that it further includes an integral rechargeable battery-charging unit connected to the battery comprising: a supercapacitor comprised of one or more sheets of graphene or a graphene-containing material; a power module adapted to provide up to 40 amps to the supercapacitor from a source of alternating current rated at 100 volts or above; an output converter adapted to deliver direct current power from the supercapacitor to the battery; and a control module adapted to control the delivery of the direct current power from the supercapacitor to the battery. Also provided is a device in which an integral rechargeable unit is the sole source of power of the device.

18 Claims, 2 Drawing Sheets

(56) References Cited

U.S. PATENT DOCUMENTS

| | | | |
|---|---|---|---|
| 2003/0080712 A1 | 5/2003 | Tamura | |
| 2004/0036449 A1 | 2/2004 | Bean | |
| 2004/0095098 A1 | 5/2004 | Turner | |
| 2004/0155631 A1* | 8/2004 | Ishizu | H02J 7/0027 320/166 |
| 2008/0181832 A1 | 7/2008 | Shiue | |
| 2010/0026248 A1* | 2/2010 | Barrade | H02J 7/0054 320/166 |
| 2010/0060243 A1* | 3/2010 | Niigaki | H01G 2/04 320/166 |
| 2011/0080689 A1* | 4/2011 | Bielawski | H01G 9/038 361/502 |
| 2012/0045688 A1 | 2/2012 | Liu et al. | |
| 2012/0068669 A1 | 3/2012 | Trainor | |
| 2012/0170171 A1 | 7/2012 | Lee et al. | |
| 2013/0119945 A1 | 5/2013 | Petersen et al. | |
| 2013/0214725 A1* | 8/2013 | Wolf | H02J 7/0024 320/107 |
| 2014/0127584 A1 | 5/2014 | Kim et al. | |
| 2014/0275817 A1 | 9/2014 | Script | |
| 2014/0321027 A1 | 10/2014 | Nguyen et al. | |
| 2015/0008867 A1 | 1/2015 | Smychkovich | |
| 2015/0086881 A1 | 3/2015 | Zhamu et al. | |
| 2015/0130395 A1 | 5/2015 | Rice | |
| 2015/0270728 A1* | 9/2015 | Williams | H02J 7/0044 320/111 |

FOREIGN PATENT DOCUMENTS

| | | |
|---|---|---|
| CN | 203826996 U | 9/2014 |
| CN | 104229780 A | 12/2014 |
| CN | 104253455 A | 12/2014 |
| EP | 2930821 A1 | 10/2015 |
| JP | 2004248398 A | 9/2004 |
| JP | 2008040471 A | 2/2008 |
| JP | 2009131089 A | 6/2009 |
| KR | 20140094346 A | 7/2014 |
| WO | 2006/112698 A2 | 10/2006 |
| WO | 2013/180661 A1 | 12/2013 |
| WO | 2014/144845 A2 | 9/2014 |
| WO | 2016075431 | 5/2016 |

\* cited by examiner

PORTABLE ELECTRONIC DEVICE

CROSS-REFERENCE TO RELATED APPLICATIONS

This application claims priority to United Kingdom Patent Application No. GB 1520868.9, filed Nov. 26, 2015, the disclosure of which is incorporated herein by reference.

FIELD OF THE DISCLOSURE

This invention relates to a portable electronic device incorporating a rapidly rechargeable battery-charging unit which includes a supercapacitor.

BACKGROUND OF THE DISCLOSURE

Portable electronic devices are today ubiquitous throughout society as illustrated by the fact that, in many developed countries, it is estimated that over 90% of their population over the age of sixteen uses a mobile phone. Whilst technical developments in the rechargeable batteries used to power such devices have meant that over the years such devices have become usable for longer and longer periods, a number of issues still remain. These include (1) the need to recharge the device more frequently as the battery ages and (2) the power demands placed by the operation of modern software which inevitably drains batteries faster. As a consequence, most users today are finding it necessary to recharge their devices more frequently than in the past.

This has in turn led to a technical problem because the current lithium-ion batteries used today are slow to recharge when plugged into a conventional electricity ring main, typically taking a period of many hours. This is particularly inconvenient for the traveller as evident by the large number of people often wanting to use wall plugs in airports, cafes, conference centres and the like. It would therefore be useful for the traveller if rapidly rechargeable electronic devices were available on the market.

One approach to solving this problem is to use a separate, ancillary charger incorporating one or more supercapacitors as they are able to both hold significant charge and to charge and discharge quickly. However as of today their stored charge density remains small and it has been estimated that a conventional supercapacitor made from double-wound aluminium foil sheets would need to be the size of a small beverage can and weigh around half a kilogram to properly charge the average smartphone. This makes them impractical to carry and connect to the device.

It is therefore one object of the present invention to provide a portable electronic device which includes a rapidly rechargeable unit comprising a supercapacitor which unit is integral with the device itself and once rapidly charged can recharge the battery over a longer period of time. It is another object of the present invention to provide a portable electronic device which uses this rapidly rechargeable unit directly as the sole power source for the device, thereby allowing the battery to be dispensed with altogether.

We have previously drawn attention on Facebook to our intention to market a graphene supercapacitor battery-charger rated at 1500 mAh that is equipped with a generic USB port that will charge any type of mobile phone or tablet. However in this generic disclosure there is no teaching of the design claimed below and in particular the nature of the control module that will be used. This battery-charger is further described in our co-pending patent application PCT/GB2015/053003.

The use of graphene in the construction of capacitors has been disclosed in WO2013180661, CN104229780, US2012170171, KR20140094346, CN104064364, US2014127584, US2012045688 and U.S. Pat. No. 8,503,161.

US20140321027 discloses a rechargeable power source for mobile devices which includes an ultracapacitor having carbon nanotubes attached to a less than 100 nm thick metal oxide layer disposed on a metal foil.

According to a first aspect of the present invention there is provided a portable battery-powered, electronic device including a battery, a microprocessor and a display screen characterised in that it further includes an integral rechargeable battery-charging unit connected to the battery comprising:

a supercapacitor comprised of one or more sheets of graphene or a graphene-containing material;
a power module adapted to provide up to 40 amps to the supercapacitor from a source of alternating current rated at 100 volts or above;
an output converter adapted to deliver direct current power from the supercapacitor to the battery; and
a control module adapted to control the delivery of the direct current power from the supercapacitor to the battery.

In one embodiment the control module includes, for example, its own microprocessor and/or switching device, for controlling some or all of its various functions automatically, and for managing and regulating a variable output from the supercapacitor. In another embodiment the control duties of this module are performed by one or more other microprocessors performing other duties for the electronic device itself; for example its CPU.

The supercapacitor itself should suitably be one capable of storing at least 1000 F (Farads) of capacitance, and preferably 2000 F, or most preferably 3000 F or greater, and delivering an output, either singularly or in combination, of at least 1000 mAh for at least 15 minutes for example from 15 to 60 minutes; or alternatively 60 minutes or longer. It should also be able to operate at a voltage of at least 2.5 v, for example in the range 2.7 to 7 v, 3 to 7 v or alternatively even above 7 v. It should be capable of charging the electrical device to which the battery-charging unit is connected to at least 20% of its capacity, for example from 20% to 50% or alternatively 50% to 100%. The charge time will depend on the maximum rate of charge allowed by the lithium batteries and/or the capacity of the input port of the device. However the battery-charging unit should be capable of charging the device to 20% in 5 to 30 minutes.

The supercapacitor employed herein suitably includes electrodes made from one or more sheets of graphene or a graphene-containing material; materials which are not only lightweight and highly electrically conductive but also able to store electrical charge at high densities. In one embodiment, the graphene-containing material comprises composite sheets of graphene and/or reduced graphene oxide particles typically less than 1 micron, preferably less than 100 nanometres, in size suspended in an electrically-conducting matrix. In such an embodiment, it is preferred that these nanoparticles exhibit mesoporosity with mesopores in the size range 2 to 50 nanometres. In another embodiment, the graphene-containing material may additionally contain carbon nanotubes, activated carbon, buckminsterfullerenes and/or be additionally doped with nanoparticles of materials which can confer a degree of pseudocapacitance behaviour on the final supercapacitor; for example salts, hydroxides and oxides of metals such as lithium or transition metals with more than one oxidation state including nickel, manganese, ruthenium, bismuth, tungsten or molybdenum. In yet another embodiment, the sheets of graphene or graphene-containing material are made manifest as a thin graphene-containing layer mounted on or printed onto a thin sheet of an electrically-conducting metal such as copper, nickel or aluminium. In one preferred embodiment, the supercapacitor is of the double-layer type and comprised of at least two electrodes each comprising aluminium foil coated with a graphene or graphene-containing material as described above separated by a polymer membrane which is impregnated with an ionic liquid having a melting point below 100° C. In one preferred embodiment this ionic liquid is selected from a low-melting salt of an alkyl or substituted-alkyl pyridinium, pyridazinium, pyrimidinium, pyrazinium, imidazolium, piperidinium, pyrrolidinium, pyrazolium, thiazolium, oxazolium or triazolium cation. In such a case it is preferred that the counter anion is large, polyatomic, and has a Van der Waals volume in excess of 50 or 100 angstroms (see for example U.S. Pat. No. 5,827,602 which provides illustrative examples which are incorporated by reference and are contemplated as being within the scope of our invention). In one embodiment, this counter-anion is selected for example from hexafluorophosphate, dicyanamide, bis(fluorosulphonyl)imide (FSI), bis(trifluoromethylsulphonyl)imide (TFSI) or bis(perfluoro $C_2$ to $C_4$ alkyl sulphonyl)imide e.g. bis(perfluoroethylsulphonyl)imide anions. In another preferred embodiment, the ionic liquid is selected from $C_1$ to $C_4$ alkyl substituted imidazolium, piperidimium or pyrrolidinium salts of these anions with any permutation of the cations and anions mentioned above being specifically envisaged as disclosed herein. Specific, non-limiting examples based on these salts include: 1-ethyl-3-methyl-imidazolium (EMIM) bis(fluorosulphonyl)imide; 1-ethyl-3-methyl-imidazolium bis(trifluoromethylsulphonyl)imide; 1-ethyl-3-methyl-imidazolium bis(perfluoroethylsulphonyl)imide; 1-methyl-1-propylpyrrolidinium bis(fluorosulphonyl)imide; 1-methyl-1-butylpyrrolidinium bis(fluorosulphonyl)imide; 1-methyl-1-propylpyrrolidinium bis(trifluoromethylsulphonyl)imide; 1-methyl-1-butylpyrrolidinium bis(trifluoromethylsulphonyl)imide; 1-ethyl-3-methyl-imidazolium hexafluorophosphate; 1-ethyl-3-methyl-imidazolium dicyanamide; 1-methyl-1-propylpyrrolidinium hexafluorophosphate; 1-methyl-1-propylpyrrolidinium dicyanamide; 1-methyl-1-butylpyrrolidinium hexafluorophosphate; and 1-methyl-1-propylpyrrolidinium dicyanamide.

In one embodiment, the supercapacitor mentioned above is manufactured as a flat sheet-like composite of graphene electrodes and ionic liquid electrolyte which is flexible enough to be coiled-up thereby saving space. In this embodiment the interstices between the coils are then typically filled with an insulator. In another embodiment, the supercapacitor is contained within a sealed pouch from which only electrical connectors protrude.

The power module is suitably adapted to receive AC power from a source rated at 110 v, 220 v, 230 v, 240 v or other domestic standard, such as a domestic or commercial ring main. This unit may additionally include a transformer to enable the supercapacitor to be charged at the optimum voltage. In another embodiment, at least one of the components in this unit may also include graphene or a graphene-containing material.

The output converter is suitably adapted to deliver direct current power to the battery in the portable electronic device for example at a voltage of less than 10 v; for example 5 v. It suitably includes an AC to DC converter.

Turning to the control module, in one embodiment this includes at least one charging-circuit adapted so that when the device is plugged in, a microprocessor located therein detects the degree to which the supercapacitor is already charged and thereafter only supplies charge from the external source to bring it back to 100% charge. In one preferred embodiment, this occurs by means of the microprocessor detecting and responding to a feedback voltage or current from the supercapacitor. In another embodiment, the control module is connected to an audible alarm or light indicator in the device, for example on the exterior casing of the device, to notify the user when charging of the supercapacitor is complete. In yet another embodiment, the control module includes additional circuitry so that, whilst the battery-charging unit is being charged or when charging is complete, the relevant device can still be powered by the battery.

The control module may further and optionally include a series of diodes or comprise one-way circuits to prevent leakage or an unsafe electrical discharge of the supercapacitor back through circuits in the device. In one embodiment, it includes a means to isolate the battery-charging unit from the battery and the rest of the device if so required. The control module may also include both voltage and heat sensors to ensure these fail-safe features are activated automatically. Finally, in one embodiment the battery-charging unit may include a means to discharge the supercapacitor quickly through resistors and associated heat sinks in the body of the device if it becomes necessary to do so in an emergency or if the user is asked to do so because of travel restrictions.

Suitably the battery-charging unit is designed and manufactured so that it conforms to EU directive EC 2002/96 on the disposal of waste electrical components or equivalent national or federal legislation in other jurisdictions around the world. Suitably the battery-charging unit also corresponds to relevant national and federal product safety legislation; for example in Europe to EC 2001/95.

The battery-charging unit of the present invention may further comprise other materials and components used in the art for example thermal insulators and heat sinks for heat management; ancillary electrical insulation; switches; and lights, dials, meters and the like for monitoring the progress of charging (both of the charger and the electrical device if required).

The portable battery-powered electronic device is suitably one selected from the group comprising laptops, electronic notebooks, netbooks, hybrids, tablets, smartphones and smartwatches. In addition to the battery charging unit, battery, microprocessor and display unit the operative parts of the device may also include one or more of the following ancillary parts: USB ports, disc drives, RAM modules, hard drives, graphics and sound cards, wireless circuitry, removal media drives, cooling fans, docking stations and the like. Suitably the battery employed in the device is a lithium-ion battery or other like battery which is itself rechargeable, the display screen is an LED display screen and the microprocessor includes central and a graphical processing chip(s).

According to a second aspect of the invention there is provided a portable electronic device including a display screen and a microprocessor characterised in that its sole source of power is an integral rechargeable power unit comprising:
  a supercapacitor comprised of one or more sheets of graphene or a graphene-containing material;
  a power module adapted to provide up to 40 amps to the supercapacitor from a source of alternating current rated at 100 volts or above;

an output converter and control module adapted to deliver direct current power to the display screen and microprocessor.

Suitably the various parts of the unit and the ancillary parts of the applicable devices are as specified above. In one embodiment the output converter and control module are connected to the central processing unit of the electronic device.

BRIEF DESCRIPTION OF THE DRAWINGS

The electronic device of the present invention is now illustrated with reference to the following description and FIGS. 1 and 2 which should not be construed as limiting the scope of the invention.

DETAILED DESCRIPTION OF THE DISCLOSURE

Figure 1:
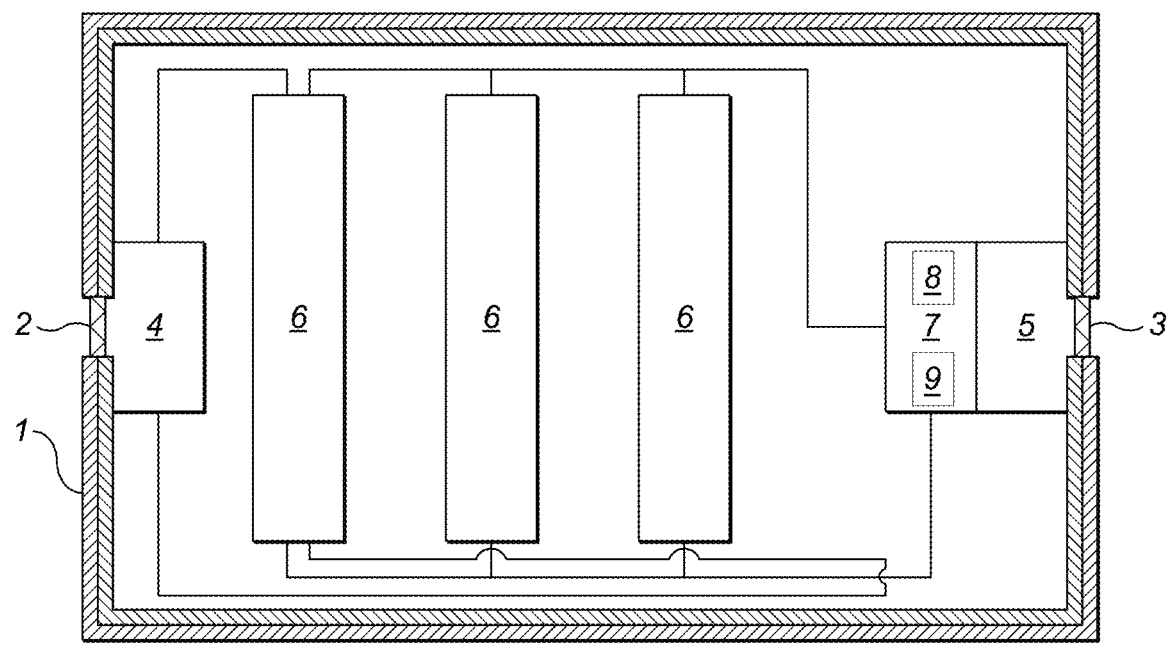

A laptop computer comprises an impact-resistant casing which is electrically insulated and contains an LED display screen, a central processing unit, graphics card and a void for receiving a lithium-ion battery and a battery-charging unit according to the present invention adapted to cooperate and electrically attach thereto. This unit is shown in detail in FIG. 1. The unit comprises a housing 1 containing a power module 4 including a transformer (not shown) and an output converter 5 attached by charging and discharging circuits to three supercapacitors 6. The supercapacitors each consist of a sealed polymer pouch containing either (a) graphene-coated aluminium foil electrodes with a polymer membrane sandwiched between and which is impregnated with the ionic liquid EMIM TFSI or (b) two coil-wound sheets of a composite comprising a sheet of graphene sandwiched between two polymer sheets. 2 comprises a 30 pin socket adapted to correspond and cooperate with an external charging port on the casing of the device whilst 3 comprises a 30 pin connector adapted to correspond and electrically connect to the lithium-ion battery co-located within the void of the device when the battery-charging unit is introduced. Integral with 5 is control module 7 for regulating current produced from 6 and flowing to the battery via 3 and for causing current to flow through a discharge circuit. The control module 7 may also include a voltage sensor 8 and a heat sensor 9.

Figure 2:
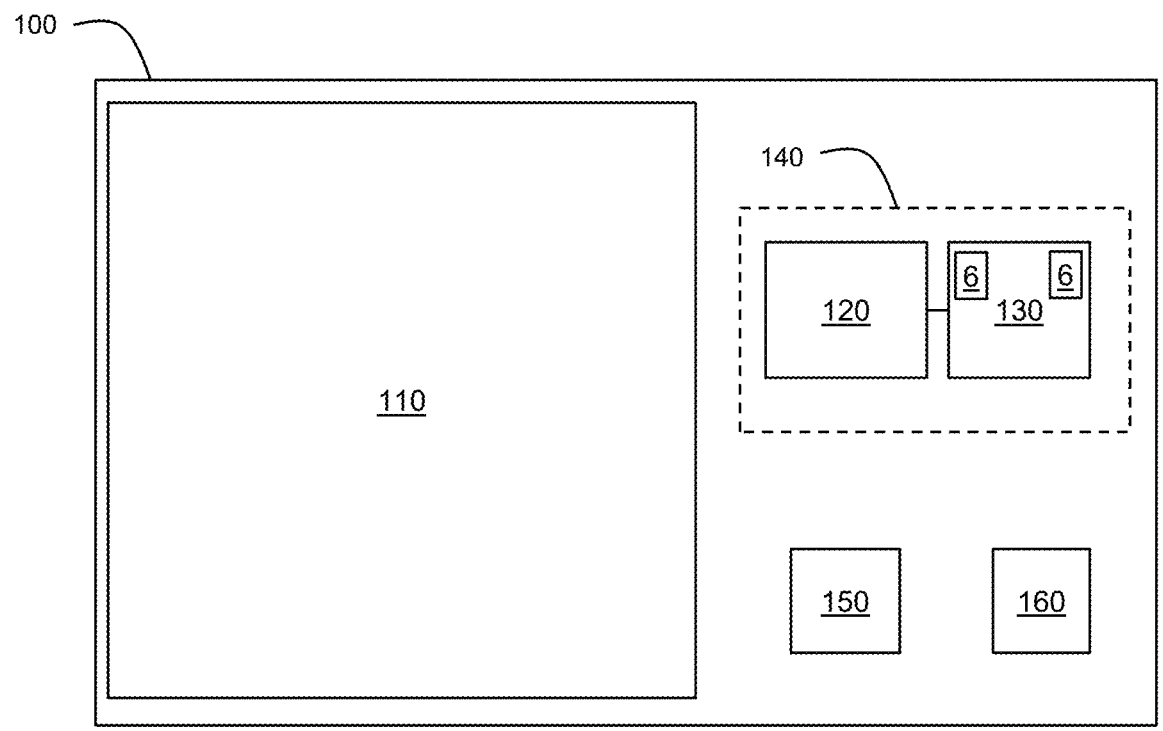

FIG. 2 shows a portable battery-powered electronic device 100 including a display screen 110, a battery 120, and an integral battery-charging unit 130 connected to the battery 120. The portable battery-powered electronic device 100 further includes a void 140 for receiving the battery 120 and the integral battery-charging unit 130. The portable battery-powered electronic device 100 further includes a microprocessor 150. The portable battery-powered electronic device 100 further includes a user-operated means 160 to discharge one or more supercapacitors 6 in the integral battery-charging unit 130.

The invention claimed is:

1. A portable battery-powered electronic device including a battery, a microprocessor and a display screen, characterised in that it further includes an integral rechargeable battery-charging unit connected to the battery, wherein the battery and the integral battery-charging unit are contained within a housing of the electronic device;

wherein the integral rechargeable battery-charging unit comprises:

a supercapacitor comprised of one or more sheets of a graphene-containing material, wherein the graphene-containing material comprises composite sheets of graphene and/or reduced graphene oxide particles less than 1 micron in size and comprising mesopores in the size range of 2 nm to 50 nm, suspended in an electrically conducting matrix, wherein the supercapacitor includes at least two electrodes each comprising a layer of graphene-containing material on a sheet of conducting metal and a polymer membrane sandwiched therebetween which is impregnated with an ionic liquid having a melting point below 100° C., wherein the ionic liquid is a low-melting salt of an alkyl or substituted-alkyl pyridinium, pyridazinium, pyrimidinium, pyrazinium, imidazolium, piperidinium, pyrrolidinium, pyrazolium, thiazolium, oxazolium or triazolium cation, and wherein the supercapacitor is capable of delivering an output of up to 1000 mAh for at least 15 minutes;

a power module adapted to provide a current up to 40 amps to the supercapacitor from a source of alternating current rated at 100 volts or above;

an output converter adapted to deliver direct current power from the supercapacitor to the battery; and a control module adapted to control the delivery of the direct current power from the supercapacitor to the battery.

2. The portable electronic device as claimed in claim 1 wherein the control module includes at least one charging circuit adapted to detect the degree to which the supercapacitor is already charged and thereafter bring it back to 100% charge.

3. The portable electronic device as claimed in claim 2 wherein the control module receiving a feedback voltage or current from the supercapacitor.

4. The portable electronic device as claimed in claim 2 wherein the control module includes means to prevent leakage or an unsafe electrical discharge of the supercapacitor back through the charging circuit(s).

5. The portable electronic device as claimed in claim 1 wherein the device includes voltage and heat sensors connected to or integral with the control module.

6. The portable electronic device as claimed in claim 1 wherein the device includes a user-operated means to discharge the supercapacitor other than through the device being charged.

7. The portable electronic device as claimed in claim 1 wherein the cation is a $C_1$ to $C_4$ alkyl substituted imidazolium, piperidinium or pyrrolidinium cation.

8. The portable electronic device as claimed in claim 1 wherein a counter-anion to the cation is hexafluorophosphate, dicyanamide, bis(fluorosulphonyl)imide, bis(trifluoromethylsulphonyl)imide or a bis(perfluoro $C_2$ to $C_4$ alkylsulphonyl)imide.

9. The portable electronic device as claimed in claim 1 wherein battery-charging is capable of charging the battery to at least 20% in 5 to 30 minutes.

10. The portable electronic device as claimed in claim 1 wherein a power source and the output converter are permanently located in a casing which also includes a housing into which the supercapacitor can be inserted or removed.

11. The portable electronic device as claimed in claim 1 wherein the power module is adapted to receive AC power from a domestic or commercial ring main.

12. The portable electronic device as claimed in claim 1 wherein the battery-charging unit is able to operate at a voltage in the range 2.7 to 7 volts.

13. The portable electronic device as claimed in claim 1, wherein the device includes a void in which the battery and battery-charging unit are cooperatively co-located.

14. The portable electronic device as claimed in claim 1, wherein the or graphene-containing material further comprises carbon nanotubes, activated carbon, or Buckminster fullerenes.

15. The portable electronic device as claimed in claim 1, wherein the graphene-containing material is doped with nanoparticles so as to impart pseudocapacitance to the supercapacitor.

16. The portable electronic device as claimed in claim 1, wherein the supercapacitor is manufactured as a flat sheet-like composite of graphene electrodes and ionic liquid electrolyte.

17. The portable electronic device as claimed in claim 1, wherein the supercapacitor is contained within a sealed pouch from which only electrical connectors protrude.

18. A portable electronic device including a display screen and a microprocessor, characterised in that its sole source of power is an integral rechargeable power unit contained within a housing of the portable electronic device;
   wherein the integral rechargeable power unit comprises:
      a supercapacitor comprised of one or more sheets of a graphene-containing material, wherein the graphene-containing material comprises composite sheets of graphene and/or reduced graphene oxide particles less than 1 micron in size and comprising mesopores in the size range of 2 nm to 50 nm, suspended in an electrically conducting matrix, wherein the supercapacitor includes at least two electrodes each comprising a layer of graphene-containing material on a sheet of conducting metal and a polymer membrane sandwiched therebetween which is impregnated with an ionic liquid having a melting point below 100° C., wherein the ionic liquid is a low-melting salt of an alkyl or substituted-alkyl pyridinium, pyridazinium, pyrimidinium, pyrazinium, imidazolium, piperidinium, pyrrolidinium, pyrazolium, thiazolium, oxazolium or triazolium cation, and wherein the supercapacitor is capable of delivering an output of up to 1000 mAh for at least 15 minutes;
   a power module adapted to provide up to 40 amps to the supercapacitor from a source of alternating current rated at 100 volts or above; and
   an output converter and control module adapted to deliver direct current power to the display screen and microprocessor.

* * * * *